US010352261B2

United States Patent
Konrad et al.

(10) Patent No.: US 10,352,261 B2
(45) Date of Patent: Jul. 16, 2019

(54) METHOD FOR SMOOTHLY CONNECTING A LOAD DURING AN ACTIVATED CYLINDER DEACTIVATION PROCESS OF AN INTERNAL COMBUSTION ENGINE

(71) Applicant: MTU FRIEDRICHSHAFEN GMBH, Friedrichshafen (DE)

(72) Inventors: Thorsten Konrad, Augsburg (DE); Wolfgang Fimml, Hörbranz (AT); Alexander Bernhard, Meckenbeuren (DE)

(73) Assignee: MTU FRIEDRICHSHAFEN GMBH, Friedrichshafen (DE)

( * ) Notice: Subject to any disclaimer, the term of this patent is extended or adjusted under 35 U.S.C. 154(b) by 0 days.

(21) Appl. No.: 15/574,564

(22) PCT Filed: May 10, 2016

(86) PCT No.: PCT/EP2016/000766
§ 371 (c)(1),
(2) Date: Nov. 16, 2017

(87) PCT Pub. No.: WO2016/184552
PCT Pub. Date: Nov. 24, 2016

(65) Prior Publication Data
US 2018/0128195 A1     May 10, 2018

(30) Foreign Application Priority Data
May 18, 2015   (DE) .......................... 10 2015 209 012

(51) Int. Cl.
*F02D 41/00*   (2006.01)
*F02D 17/02*   (2006.01)

(52) U.S. Cl.
CPC ......... *F02D 41/0082* (2013.01); *F02D 17/02* (2013.01); *F02D 41/0002* (2013.01);
(Continued)

(58) Field of Classification Search
CPC ...... F02D 17/02; F02D 41/00; F02D 41/0002; F02D 41/0082; F02D 41/0087; F02D 41/027; Y02T 10/46
(Continued)

(56) References Cited

U.S. PATENT DOCUMENTS

| 4,550,704 A | 11/1985 | Barho et al. |
| 5,154,151 A | 10/1992 | Bradshaw et al. |

(Continued)

FOREIGN PATENT DOCUMENTS

| DE | 19604737 A1 | 8/1997 |
| DE | 102008005205 A1 | 7/2008 |
| DE | 102013213697 A1 | 1/2015 |

*Primary Examiner* — John Kwon
*Assistant Examiner* — Johnny H Hoang
(74) *Attorney, Agent, or Firm* — Lucas & Mercanti, LLP; Klaus P. Stoffel

(57) ABSTRACT

A method for operating an internal combustion engine, in particular a gas engine, having two cylinder banks, each of which includes multiple cylinders, wherein each cylinder bank is independently supplied with charging pressure, and having a device for actively deactivating at least one cylinder of each cylinder bank. When the operating state is switched from a state with at least one deactivated cylinder to an operating state with at least one other activated cylinder, the charging pressure is reduced prior to the activation of the other cylinder.

5 Claims, 2 Drawing Sheets

(52) U.S. Cl.
CPC ...... *F02D 41/0087* (2013.01); *F02D 2250/21* (2013.01); *Y02T 10/42* (2013.01)

(58) Field of Classification Search
USPC .............................................. 123/481, 198 F
See application file for complete search history.

(56) References Cited

U.S. PATENT DOCUMENTS

| | | | |
|---|---|---|---|
| 5,562,086 A | 10/1996 | Asada et al. | |
| 6,382,193 B1* | 5/2002 | Boyer | F01L 9/04 |
| | | | 123/198 F |
| 6,874,463 B1* | 4/2005 | Bolander | F02D 11/105 |
| | | | 123/198 F |
| 2003/0106524 A1 | 6/2003 | Glugla et al. | |
| 2006/0005811 A1 | 1/2006 | Hartmann | |
| 2012/0285161 A1* | 11/2012 | Kerns | F02D 41/0087 |
| | | | 60/598 |
| 2016/0010568 A1* | 1/2016 | Whiston | F02D 13/06 |
| | | | 123/445 |
| 2016/0108828 A1* | 4/2016 | Glugla | F02D 41/0087 |
| | | | 123/344 |
| 2016/0146120 A1* | 5/2016 | Kawaguchi | F01L 1/267 |
| | | | 123/559.2 |
| 2016/0146140 A1 | 5/2016 | Fimml et al. | |
| 2016/0312687 A1* | 10/2016 | Kemmerling | F02B 37/002 |
| 2017/0356368 A1* | 12/2017 | Richards | F02D 41/0087 |
| 2018/0010533 A1* | 1/2018 | Yu | F02D 41/18 |

* cited by examiner

METHOD FOR SMOOTHLY CONNECTING A LOAD DURING AN ACTIVATED CYLINDER DEACTIVATION PROCESS OF AN INTERNAL COMBUSTION ENGINE

The present application is a 371 of International application PCT/EP2016/000766, filed May 10, 2016, which claims priority of DE 10 2015 209 012.4, filed May 18, 2015, the priority of these applications is hereby claimed and these applications are incorporated herein by reference.

BACKGROUND OF THE INVENTION

The invention relates to a method for smoothly connecting a load during an activated cylinder deactivation process of an internal combustion engine.

In the case of the operation of internal combustion engines, in particular gas engines, with a plurality of cylinders which are arranged in two cylinder banks, it is known to provide a cylinder deactivation process in the lower engine map range, in particular while idling, in order to save fuel and in order to optimize the power output. Said cylinder deactivation process also serves, in particular, to reduce pollutants. Cylinder deactivation processes of this type are usually performed in gasoline engines.

As a result of the deactivation of individual cylinders, the remaining cylinders have to produce the required power output of the internal combustion engine. This results in a higher specific cylinder power output of the active cylinders. In order to be able to produce a higher specific power output of this type in quantity-regulated engines, an increase in the boost pressure is required. This is usually realized by way of a change of the throttle valve position. If the deactivated cylinders are then activated again during the operation of the internal combustion engine, torque surges occur, that is to say brief increases in the respective torque, since the boost pressure of the internal combustion engine is still regulated to the operation with the reduced number of cylinders. The boost pressure is then reduced only during a subsequent setting of the required power output of the internal combustion engine.

A stepped individual activation of individual cylinders does not remedy the described problem, since torque surges nevertheless occur.

In gasoline engines, leaning of the mixture and an associated reduction in the fuel power output is not possible or is possible only within very small limits, since there is the risk of misfires. In the case of leaning of the mixture to values, at which it can still be burned reliably, the above-described torque surges nevertheless occur.

The torque surges are undesirable, in particular, because they involve loads on the drive train. Furthermore, the smooth running of the internal combustion engine is impaired, and there is the possibility of rotational speed fluctuations.

SUMMARY OF THE INVENTION

The invention is based on the object of providing a method for operating an internal combustion engine of the type mentioned at the outset, which method prevents torque surges with a simple configuration and simple, operationally reliable applicability.

According to the invention, a method has therefore been provided for operating an internal combustion engine, in particular a gas engine, in particular a gasoline engine. Said method is used, in particular, in an internal combustion engine which comprises two cylinder banks with in each case a plurality of cylinders, for example with in each case six cylinders. According to the invention, boost pressure is fed independently to each cylinder bank. An active cylinder deactivation process takes place by means of a customary apparatus which, for example, interrupts the ignition circuit and/or a fuel supply. According to the invention, it is provided in the case of the method that, in the case of a change from an operating state with at least one deactivated cylinder to an operating state with at least one further activated cylinder, the boost pressure is reduced before the activation of the further cylinder.

According to the invention, a decrease in the boost pressure therefore takes place, and therefore a power output reduction in the previously active cylinders, before the additional cylinders are activated again. Said brief decrease in the boost pressure and said brief reduction in the power output prevent the cylinders which are then additionally activated from being operated, at the beginning of their activation, with the full power output which was previously set for the original active cylinders. A torque surge is prevented in this way.

According to the invention, the power output of the internal combustion engine can subsequently be adapted in a customary way, without torque surges occurring and without the smooth running of the engine being impaired.

Therefore, as mentioned, the performance of the method according to the invention avoids torque surges in the case of the activation of additional cylinders which were previously deactivated. A further advantage lies in the fact that satisfactory smooth running of the internal combustion engine without rotational speed fluctuations is ensured.

According to the invention, a constant power output of the internal combustion engine can therefore be ensured in the case of the change in the number of active cylinders.

It is particularly advantageous if the change in the boost pressure takes place to the required value which is required during the operation after the changeover or activation of the cylinders. The method according to the invention can therefore be carried out simply, since no additional control variables or the like have to be taken into consideration.

In one advantageous development of the method according to the invention, in order to ensure that no torque surge occurs, the actuation or activation of the one additional cylinder or the plurality of additional cylinders takes place only after the reduced boost pressure is reached or set. This ensures the switchover without torque surges.

The method according to the invention can also be carried out in an analogous way in the case of a transition from an operating state with a plurality of active cylinders to an operating state with at least one deactivated cylinder. The boost pressure would then be increased briefly, in order to ensure a constant power output of the internal combustion engine, even in the case of a reduced number of active cylinders.

The change in the boost pressure preferably takes place within the limits of a switching hysteresis of the internal combustion engine which results in the case of activation or deactivation of cylinders.

According to the invention, the change in the boost pressure can also take place by way of a change of the position of a throttle valve which is assigned to the respective cylinder bank. Therefore, the method can be used even in the case of an internal combustion engine with intake manifolds.

An internal combustion engine with two cylinder banks which act parallel to one another is frequently operated in such a way that a switchover or change between the individual cylinder banks is carried out in the case of activation of only a limited number of cylinders. The method according to the invention can also advantageously be used here.

Internal combustion engines with twelve cylinders which are arranged in two cylinder banks can be operated with merely three of the twelve cylinders in the lower engine map range or while idling. In the case of a desired power output increase, three additional cylinders which were previously deactivated are then activated, which results in operation with six cylinders. In the case of another power output increase, all twelve cylinders can then be activated. The method according to the invention can then be used particularly advantageously, in particular, in processes of this type.

BRIEF DESCRIPTION OF THE DRAWING

In the following text, the invention will be described using one exemplary embodiment in conjunction with the drawing, in which.

DETAILED DESCRIPTION OF THE INVENTION

Figure 1:
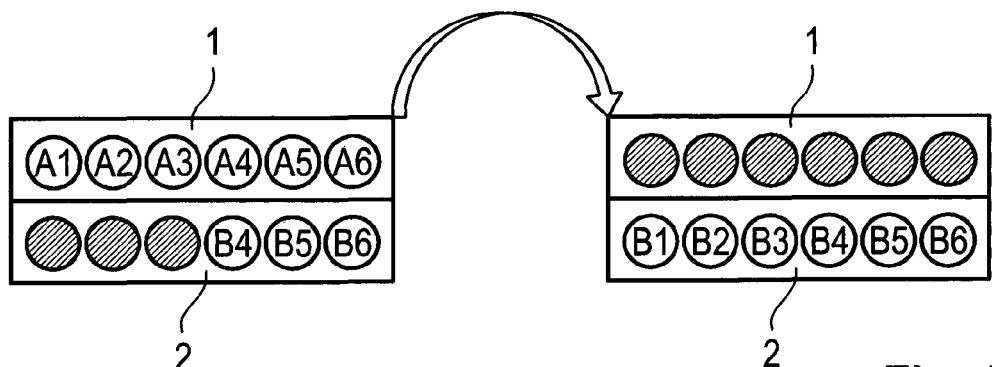
FIG. 1 shows a diagrammatic illustration of an internal combustion engine with two cylinder banks with in each case six cylinders in different activation states.

FIG. 1 shows a simplified plan view of an internal combustion engine according to the invention which has two cylinder banks 1, 2 which are parallel to one another. In each case six cylinders which are denoted by A1 to A6 and B1 to 66 are provided in each of the cylinder banks 1, 2. It can be seen on the left-hand illustration of FIG. 1 that merely three cylinders are activated, namely the cylinders B1, B2 and B3. In the case of a switchover of the operation, six cylinders are subsequently activated, namely the cylinders A1 to A6 of the cylinder bank 1. The cylinders of the cylinder bank 2 are deactivated, just as all the cylinders A1 to A6 of the cylinder bank 1 are deactivated in the left-hand image half of FIG. 1.

Figure 2:
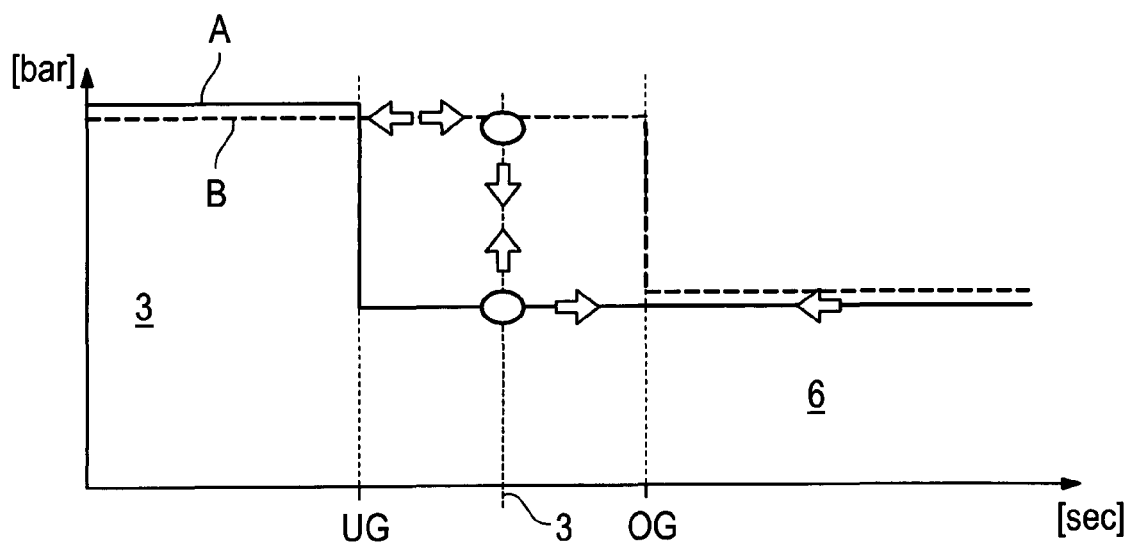
FIG. 2 shows a graphic illustration of the dependence of the throttle valve position or the boost pressure on time when the method according to the invention is carried out.

FIG. 2 shows a diagram, in which the time is plotted on the abscissa, whereas the ordinate represents the throttle valve position in percent or the boost pressure in bar. The switching hysteresis in the case of the activation or deactivation of the cylinders is shown on the abscissa with the left-hand lower limit UG and the right-hand upper limit OG. The right-hand region of FIG. 2 shows six cylinder operation using the number 6, whereas the left-hand region represents three cylinder operation of the internal combustion engine which is shown in FIG. 1 using the number 3. The solid line is denoted by A and represents the cylinder bank 1 with the cylinders A1 to A6, whereas the dashed line which is shown by B represents the cylinder bank 2 with the cylinders B1 to B6.

The designation 3 on the abscissa shows the dashed line which represents the transition from three to six cylinders and therefore the switching point from three to six cylinders, in accordance with the illustration in FIG. 1. According to the invention, in the case of a transition from three cylinder operation to six cylinder operation, the boost pressure or the throttle valve position is lowered when the switching point (oval circle) is reached on the dashed line, in order to assume the value of the switching point (oval circle) on the solid line of the six cylinder operation. An activation of the additional cylinders in accordance with the illustration of the right-hand image half of FIG. 1 takes place subsequently.

In an analogous manner, starting from six cylinder operation, an increase in the boost pressure or an increase in the throttle valve position (opening) takes place when the switching point is reached and before the deactivation of three cylinders and the transition to the three cylinder operation.

Figure 3:
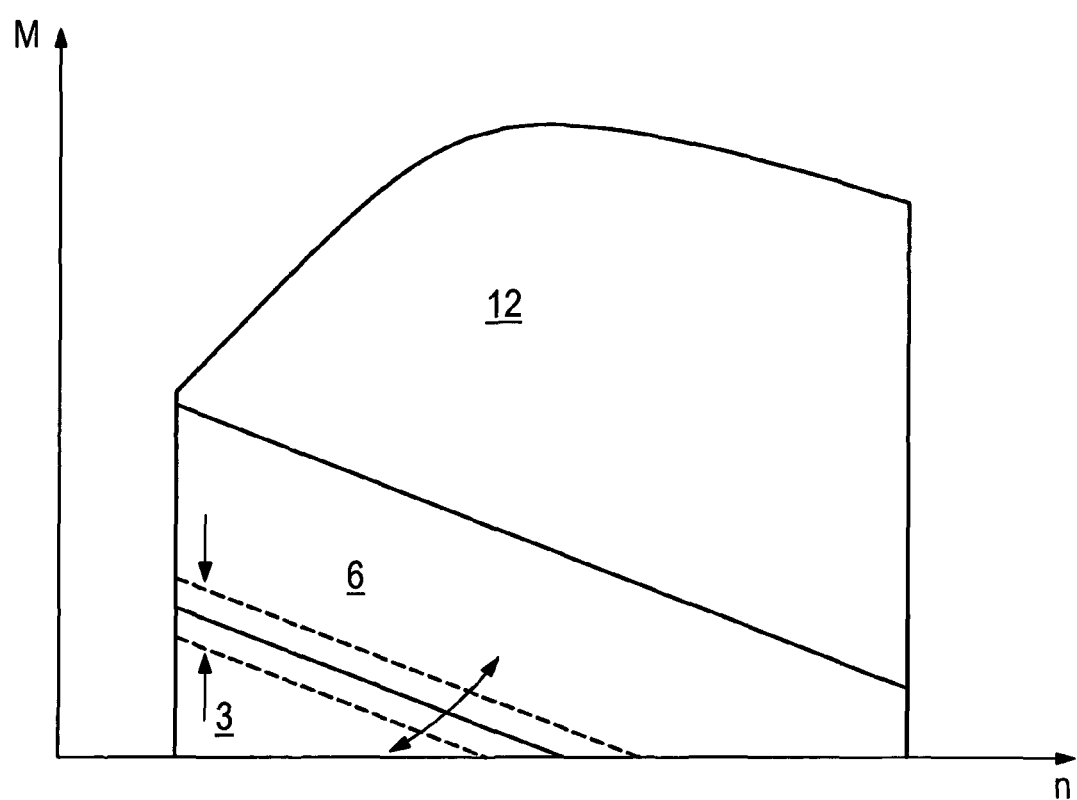
FIG. 3 shows a graphic illustration of the rotational speed and the torque which occurs in the case of operation with different numbers of cylinders.

FIG. 3 shows the rotational speed n on the abscissa and the torque M on the ordinate. Overall, an engine map is shown diagrammatically which represents twelve cylinder operation in the upper region using the number 12. The number 6 identifies six cylinder operation, whereas the number 3 shows three cylinder operation. The switching hysteresis which is shown in FIG. 2 results between the dashed lines, the two arrows representing the transition from three cylinder operation to six cylinder operation.

The invention claimed is:

1. A method for operating an internal combustion engine, having two cylinder banks that each have a plurality of cylinders and an apparatus for active cylinder deactivation of at least one cylinder of each cylinder bank, wherein each of the cylinder banks has a throttle valve, the method comprising the steps of: feeding boost pressure independently to each cylinder bank by changing a position of the respective throttle valves; and, in one operating state, deactivating all cylinders in a first of the cylinder banks and activating a number of cylinders in a second of the cylinder banks; changing the active cylinders from one of the cylinder banks to another cylinder bank during a transition from the one operating state to another operating state, wherein a change in the number of active cylinders is carried out during the transition from the one operating state to the other operating state; changing the boost pressure during the transition from the one operating state to the another operating state to a value necessary for operation after the transition; and, activating the cylinders that are to be active after the transition after reaching or after adjusting the necessary value of the boost pressure, wherein the boost pressure is increased with a reduction in the number of active cylinders and is reduced with an increase in the number of active cylinders.

2. The method according to claim 1, wherein a change in the boost pressure takes place within limits of a switching hysteresis of the internal combustion engine that results from activation or deactivation of cylinders.

3. The method according to claim 1, wherein a change in the boost pressure takes place by way of a change of position of a throttle valve assigned to a respective cylinder bank.

4. The method according to claim 1, wherein the internal combustion engine has six cylinders in each cylinder bank.

5. The method according to claim 4, including carrying out the method upon a transition of engine operation from three to six cylinders.

* * * * *